United States Patent

[11] 3,583,734

| [72] | Inventor | Hugo Magi<br>Etobicoke, Ontario, Canada |
|---|---|---|
| [21] | Appl. No. | 790,598 |
| [22] | Filed | Jan. 13, 1969 |
| [45] | Patented | June 8, 1971 |
| [73] | Assignee | Dominion Auto Accessories Limited<br>Toronto, Ontario, Canada |

[54] HINGE JOINT ASSEMBLIES
3 Claims, 6 Drawing Figs.

[52] U.S. Cl. .................................................. 287/92,
248/478, 64/28
[51] Int. Cl. .................................................... B25g 3/38,
F16c 11/00
[50] Field of Search ........................................ 287/14, 92,
101; 248/478; 64/29, 28; 74/501 (P); 297/374

[56] References Cited
UNITED STATES PATENTS

| 3,107,077 | 10/1963 | Lassa ............................. | 248/478 |
| 3,123,041 | 3/1964 | Gunderson ..................... | 248/478 |
| 3,384,334 | 5/1968 | Malachowski ................. | 248/478 |

FOREIGN PATENTS

| 1,166,284 | 11/1958 | France ......................... | 64/29 |
| 1,163,613 | 1/1954 | Germany ...................... | 64/29 |
| 555,482 | 6/1923 | France ......................... | 287/92 |

*Primary Examiner*—David J. Williamowsky
*Attorney*—Sim & McBurney

ABSTRACT: A hinge joint assembly for pivotally connecting two structural members together. The assembly includes two lock members, one connected to each structural member. One lock member has teeth extending radially inwardly toward the pivot axis of the two structural members, and the other lock member has at least one finger capable of radial reciprocation with respect to said pivot axis. The finger is biased toward an outer position wherein it meshes with the radially inwardly extending teeth, thereby locking the lock members in one orientation. The lock members and thus the structural members may be moved with respect to one another provided sufficient torque is exerted to urge the finger radially inwardly.

PATENTED JUN 8 1971 3,583,734

INVENTOR.
HUGO MAGI
BY Harold G. Vesa

HINGE JOINT ASSEMBLIES

This invention relates generally to hinge joint assemblies adapted to hold two pivotally connected structural members in a plurality of angular relationships. The tendency of the hinge joint assembly to hold the structural members in any one of the plurality of angular relationships can be forcibly overcome in order to shift the structural members from one angular relationship to another. The hinge joint assembly of this invention is particularly useful for mounting the horizontally swingable West Coast type of truck mirror on the side of a truck.

It is an object of this invention to provide a hinge joint assembly wherein the construction of the assembly components is such as to preclude the entry of foreign matter into the assembly.

It is a further object of this invention to provide a hinge joint assembly in which axial thrust forces are eliminated.

Accordingly, this invention provides, for use with a hinge joint between two structural members pivotally connected together about a pivot axis, an assembly comprising: a first lock member adapted to be fixed with respect to one of said structural members about said pivot axis, said first lock member having tooth means extending radially toward said pivot axis and defining inwardly opening recesses arranged as diametrically opposed pairs, a second lock member adapted to be fixed with respect to the other of said structural members about said pivot axis, said second lock a member including two antipodal finger members each having an outwardly projecting finger, each finger member being capable of radial reciprocation with respect to said pivot axis between a first position in which it is adapted to lodge in any one of said recesses and a second position in which it is withdrawn from said recesses, and biasing means urging said finger members toward said first position, both said fingers being shaped such that relative rotation of one lock member with respect to the other lock member with sufficient torque will urge the fingers radially inwardly against said biasing means and permit the lock members to move from a first relative orientation in which the fingers are lodged in one pair of diametrically opposed recesses to a second relative orientation in which the fingers are lodged in an adjacent pair of diametrically opposed recesses.

One embodiment of this invention is shown in the accompanying drawings, in which like numerals denote like parts throughout the several views, and in which.

Figure 1:
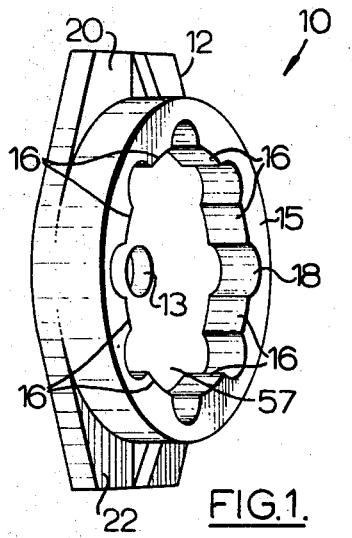
Fig. 1 is a perspective view of one of the lock members of a hinge joint incorporating this invention.

Turning first to FIG. 1, there is shown a first lock member 10. The lock member 10 comprises a plate 12 having a central aperture 13 and an integral, axially extending peripheral flange 15 which integrally supports eight radially inwardly extending teeth 16. The inwardly extending teeth 16 can be considered the result of the removal of cylindrical portions 18 from the flange 15 at spaced intervals, although the lock member 10 would normally be moulded in its final shape, including the cylindrical portions 18. These intertooth spacings will hereinafter be called recesses 18. The plate 12 extends away from the generally cylindrical peripheral flange 15 at points diametrically disposed with respect to the flange 15, to form two extensions 20 and 22 which serve a purpose that can be more clearly explained with reference to FIG. 6. The lock member 10 is intended to be fixed with respect to a structural member 24 which comprises a metal tube 25 which has been flattened at one end 26. The flattened end 26 is provided with an aperture 28 and two rectangular openings 30, one on either side of the aperture 28. The lock member 10 is provided, on its face remote from the flange 15, with two rectangular embossments 32, which are intended to fit complementally into the openings 30 in the flattened end 26 of the structural member 24. As is obvious, the extensions 20 and 22 of the plate 12 provide a base for the embossments 32. Naturally, the extensions 20 and 22 could be omitted, and the embossments 32 could be moved inwardly toward the aperture 13, but the further away from the aperture 13 are the embossments 32, the smaller will be the shear forces on the embossments 32.

Figure 2:
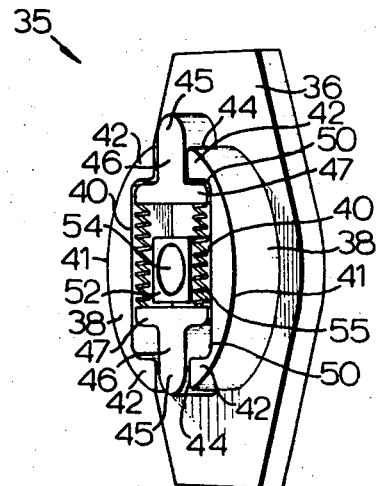
Fig. 2 is a perspective view of the other of the lock members of the hinge joint.

Turning now to FIG. 2, there is shown the second locking element 35, which is seen to comprise a plate 36, and two integral partitions 38 whose outer surfaces form part of a cylinder. The shape of the partitions 38 can be more clearly understood from FIG. 5, to which attention is now directed. Each partition 38 has a straight inner wall 40, a cylindrical outer wall 41, and two inward projections 42. The corresponding inward projections 42 of the two partitions 38 are spaced from one another leaving an opening 44 through which a finger 45, forming an integral part of a finger member 46, can project. The finger member 46 as a whole is T-shaped with the finger 45 constituting the stem of the T and a base 47 constituting the crossmember of the T. The straight walls 40 of the partitions 38 define two communicating tracks 50 along which the finger members 46 can reciprocate in opposite directions. In fact, of course, the two tracks 50 are the opposite ends of a single track, but because of a rectangular boss 52 located centrally on the plate 36, two tracks 50 are defined. The rectangular boss 52 has a central aperture 54.

Two compression coil springs 55 are provided, one on either side of the rectangular boss 52, each extending between the bases 47 of the finger members 46. The coil springs 55 constitute biasing means for each finger member 46 which tends to urge the finger member 46 radially outwardly to the position in which the upper finger member 46 has been drawn in FIG. 5, wherein the finger 45 protrudes beyond the hypothetical cylindrical surface defined by the outer walls of the partitions 38.

Figure 3:
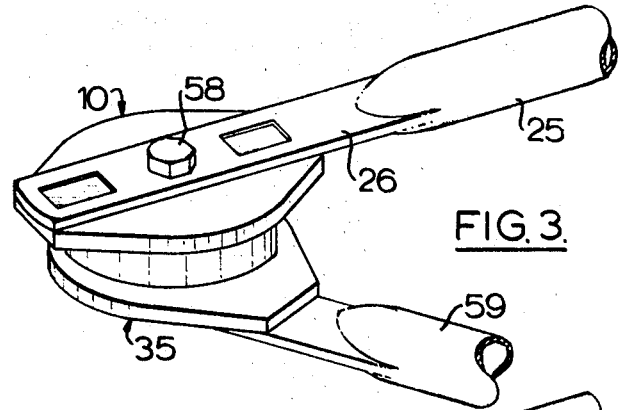
Fig. 3 is a perspective view of the hinge joint of this invention in assembled condition showing the structural members to which the two lock members of the hinge joint are fixed.
Figure 6:
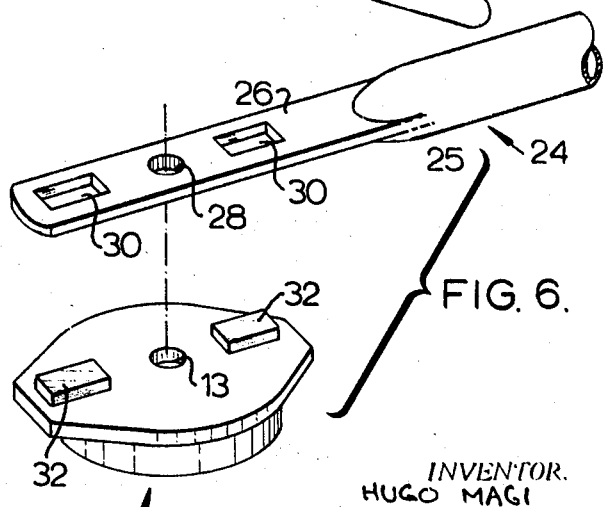
Fig. 6 is a perspective view of one structural member and one of the lock members, showing the way in which they are adapted to be fixed together.

As shown in FIG. 3, the hinge joint of this invention is adapted to be assembled with the partitions 38 and finger members 46 of the second lock member 35 being received within a cavity 57 defined by the flange 15 of the lock member 10. A bolt, of which the head 58 is visible in FIG. 3, passes through the aperture 28 in the structural member 24, the apertures 13 and 54 of the two lock members 10 and 35 respectively, and through a further aperture in a second structural member 59 which identical, to all intents and purposes, with the structural member 24. Thus, the engaging lock members 10 and 35 are sandwiched between the two lock members 24 and 59. The method by which the second lock member 35 is fixed with respect to the structural member 59 is identical with the method of fixing lock member 10 to structural member 24. This method is shown in FIG. 6. The bolt with the head 58 has an unthreaded shank portion just long enough to pass through the assembly between the outer surfaces of structural members 24 and 59, and then continues with a threaded portion on which a nut (not shown) can be tightened in such a way that it may lock on the bolt but not compress the lock members 10 and 35 together. In other words, the bolt is adapted to hold the lock members 10 and 35 in engagement without axial compression. Bolts of this type are well known in the art to which this invention pertains.

It is preferable, where the hinge joint of this invention is intended for exterior use, as with truck mirrors, to orient the assembly with the lock member 10 uppermost, so that rainwater will be kept out of the assembly between the lock members.

Figure 4:
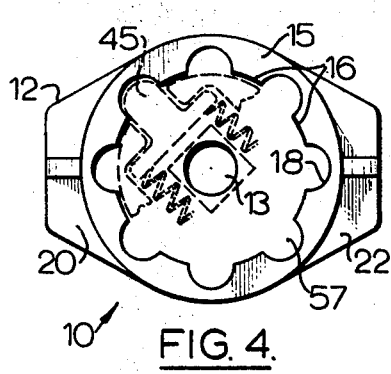
Fig. 4 is a plan view of the internal face of the lock member of FIG. 1.

When the lock members 10 and 35 are assembled together, the fingers 45 mesh with the teeth 16 as shown in FIG. 4.

Another way of looking at the engagement is to consider that the fingers 45 are received within the recesses 18 in the flange 15, although this comes to the same thing. The fingers 45 have a tendency to remain engaged in their particular recesses 18 due to the coil springs 55. When the finger 45 is thus engaged in one of the recesses 18, the effect is to restrain relative rotation between the two lock members 10 and 35. In accordance with this invention, the finger 45 is shaped such that the relative rotation of one lock member with respect to the other lock member with sufficient torque will urge the finger radially inwardly against the coil spring 55 and permit the locking members to rotate with respect to one another. In the embodiment shown, it is the rounded outer surface of the fingers 45, and the rounded inner surface of the recesses 18, which make it possible to turn one of the locking members with respect to the other with sufficient torque to cause the finger member 46 to move inwardly against the bias of the coil spring 55. Thus, one lock member can be turned with respect to the other lock member in such a way that it indexes around in step-wise fashion between positions in which the fingers 45 are locked in different pairs of diametrically opposed recesses 18.

The preferred material for moulding the lock members 10 and 35, as well as the finger members 46, is acetal, although it will be appreciated that a number of other plastic substances can be used as well.

Although eight teeth 16 have been shown in the flange 15, it will be appreciated that any number of teeth could be provided, depending on how many different relative orientations are desired.

The strength of the coil springs 55 determines the extent of the resistance, put up by the lock elements 10 and 35, to rotation away from any given at rest orientation.

Figure 5:
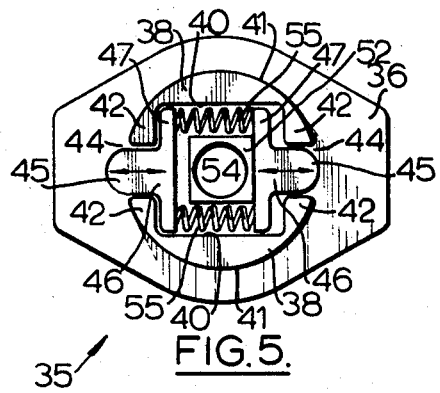
Fig. 5 is a plan view of the internal face of the lock member in FIG. 2.

In FIGS. 4 and 5, the lock members 10 and 35 protrude toward the viewer from the plates 12 and 36, and the finger members 46, although not integral with the plate 36, do have approximately the same thickness as the partitions 38.

What I claim as my invention is:

1. For use with a hinge joint between two structural members pivotally connected together about a pivot axis, an assembly comprising:
    a first lock member adapted to be fixed with respect to one of said structural members about said pivot axis, said first lock member including a plate having a central aperture and an integral axially extending peripheral flange integrally supporting a plurality of radially inwardly extending teeth spaced equidistantly from said pivot axis and defining substantially identical recesses opening inwardly and arranged as diametrically opposed pairs spaced around said peripheral flange,
    a second lock member adapted to be fixed with respect to the other of said structural members about said pivot axis, said second lock member including a plate having a central aperture, said last-mentioned plate supporting partition means defining tracks, two finger members adapted to reciprocate along said tracks in opposite directions radially of the pivot axis, each finger member including an outwardly projecting finger, each finger member being adapted to reciprocate along said tracks between a first position in which its respective finger lodges in any one of said recesses and a second position in which its respective finger is withdrawn from said recesses,
    the fingers being rounded and the recesses being substantially complementary to the fingers,
    the spring means urging the finger members apart toward said first position, said spring means being braced against each finger member to exert force on the other finger member such that the separative force on the finger members is substantially the same, whereby relative rotation of one lock member with respect to the other lock member with sufficient torque will urge the finger members radially inwardly against said biasing means to permit the lock members to move from a first relative orientation in which the fingers are lodged in one pair of diametrically opposed recesses to a second relative orientation in which the fingers are lodged in an adjacent pair of diametrically opposed recesses.

2. The invention claimed in claim 1, in which said biasing means comprises two parallel compression coil springs arranged on either side of the central apertures of said plates.

3. The invention claimed in claim 2, in which each finger member is T-shaped, the stem of the "T" constituting the said finger of the finger member.